(12) United States Patent
Ye et al.

(10) Patent No.: US 9,965,115 B2
(45) Date of Patent: May 8, 2018

(54) ARRAY SUBSTRATE AND TOUCH DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Benyin Ye, Beijing (CN); Haodi Liu, Beijing (CN); Liang Li, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 135 days.

(21) Appl. No.: 14/761,819

(22) PCT Filed: Sep. 30, 2014

(86) PCT No.: PCT/CN2014/087963
§ 371 (c)(1),
(2) Date: Jul. 17, 2015

(87) PCT Pub. No.: WO2016/000338
PCT Pub. Date: Jan. 7, 2016

(65) Prior Publication Data
US 2016/0246410 A1    Aug. 25, 2016

(30) Foreign Application Priority Data
Jul. 4, 2014    (CN) .......................... 2014 1 0318179

(51) Int. Cl.
*G06F 3/044*    (2006.01)

(52) U.S. Cl.
CPC .... *G06F 3/044* (2013.01); *G06F 2203/04107* (2013.01)

(58) Field of Classification Search
CPC ...................................................... G06F 3/044
See application file for complete search history.

(56) References Cited

U.S. PATENT DOCUMENTS

2013/0062179 A1*    3/2013    Ye .......................... G06F 3/041
                                                                    200/512
2013/0307793 A1    11/2013    Song et al.
(Continued)

FOREIGN PATENT DOCUMENTS

CN    101788875 A    7/2010
CN    102841718 A    12/2012
(Continued)

OTHER PUBLICATIONS

International Search Report Appln. No. PCT/CN2014/087963; dated Apr. 8, 2015.
(Continued)

*Primary Examiner* — Premal R Patel
(74) *Attorney, Agent, or Firm* — Ladas & Parry LLP; Loren K. Thompson

(57) ABSTRACT

An array substrate and a touch screen are disclosed. The array substrate includes an array formed of a plurality of driving electrodes and a plurality of sensing electrodes, which have the same electrode structure. The electrode structure includes a T-shaped electrode trunk and a plurality of electrode branches, which are symmetrically distributed and connected to the electrode trunk, forming two parts, i.e., a first sub-electrode and a second sub-electrode, symmetrical with respect to the electrode trunk. The sensing electrodes include first sensing electrodes and second sensing electrodes. One first sensing electrode and one second sensing electrode are disposed in two intervals of three (Continued)

sequentially adjacent driving electrodes respectively. Branches of a driving electrode are disposed in gaps between adjacent branches of adjacent sensing electrodes. In the array substrate, the sensing area between driving electrodes and sensing electrodes is increased and the capacitive coupling therebetween is improved.

12 Claims, 3 Drawing Sheets

(56) References Cited

U.S. PATENT DOCUMENTS

| | | | |
|---|---|---|---|
| 2013/0329347 A1* | 12/2013 | Kuo | H03K 17/962 361/679.01 |
| 2014/0051318 A1 | 2/2014 | Cok | |
| 2014/0168154 A1 | 6/2014 | Wang et al. | |
| 2015/0220174 A1 | 8/2015 | Mu et al. | |

FOREIGN PATENT DOCUMENTS

| | | |
|---|---|---|
| CN | 102948106 A | 2/2013 |
| CN | 103049156 A | 4/2013 |
| CN | 103150069 A | 6/2013 |
| CN | 103399665 A | 11/2013 |
| CN | 103425314 A | 12/2013 |
| CN | 103488326 A | 1/2014 |
| CN | 103713414 A | 4/2014 |

OTHER PUBLICATIONS

Written Opinion of the International Searching Authority Appln. PCT/CN2014/087963; dated Apr. 3, 2015.
First Chinese Office Action dated Jun. 24, 2016; Appln. No. 201410318179.5.
Second Chinese Office Action dated Oct. 14, 2016; Appln. No. 201410318179.5.
The Extended European Search Report dated Jan. 10, 2018; Appln. No. 14882158.0.

* cited by examiner

ARRAY SUBSTRATE AND TOUCH DISPLAY DEVICE

TECHNICAL FIELD

Embodiments of the present invention relate to an array substrate and a touch display device.

BACKGROUND

At present, touch screens are a newest type of information input devices, which support human-computer interaction in a simple, convenient and natural manner, and are the most modern interactive multimedia devices. A capacitive touch screen has such advantages as rapid touch response, multi-touch capability, etc. A single-layer on-cell capacitive touch screen has such advantages as a low weight and a small thickness, low manufacturing cost, integration of touch and display, etc. The single-layer on-cell capacitive touch screen that supports frame adhesion is widely preferred by end users for its advantages such as inexpensive materials for the outer layer for bonding, simplicity of process, convenience of repair, etc.

In a frame adhesion structure, there is a layer of air between the outer layer and touch sensors. Since the dielectric constant of air is lower than those of other materials (e.g., liquid optical clear adhesive (LOCA)), electric field sensing (i.e., capacitive coupling) between touch driving electrodes and touch sensing electrodes is weakened with the result that touch signals are significantly reduced and the touch performance is degraded. One solution for enhancement of touch signals is to simply increase the two-dimensional size (length and width) of individual driving electrodes and sensing electrodes; however, the center-to-center spacing between adjacent electrodes is increased accordingly. In consequence, the minimum of discrimination spacing for two fingers is significantly increased and the linearity is significantly deteriorated, seriously affecting the overall touch performance.

Therefore, it has become very important to ensure good touch performance without changing other materials of the whole on-cell touch screen module.

SUMMARY

At least one embodiment of the present invention provides an array substrate, which can ensure good touch performance without changing other structures in the whole on-cell touch screen module.

At least one embodiment of the present invention provides an array substrate, which includes an array formed of a plurality of driving electrodes and a plurality of sensing electrodes, and the driving electrodes and the sensing electrodes have the same electrode structure. The electrode structure includes a T-shaped electrode trunk and a plurality of electrode branches, which are distributed symmetrically and connected to the electrode trunk, forming two symmetrical parts, i.e., a first sub-electrode and a second sub-electrode. The sensing electrodes include first sensing electrodes and second sensing electrodes. One first sensing electrode and one second sensing electrode are disposed in two intervals of three sequentially adjacent driving electrodes respectively. A driving electrode has its electrode branches disposed in gaps between adjacent electrode branches of the sensing electrodes adjacent to the driving electrodes. The first sensing electrodes and the second sensing electrodes are connected to different signal lines respectively.

At least one embodiment of the present invention further provides a touch display device that includes any of the above-mentioned array substrates.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not imitative of the invention.

DETAILED DESCRIPTION

Figure 1:
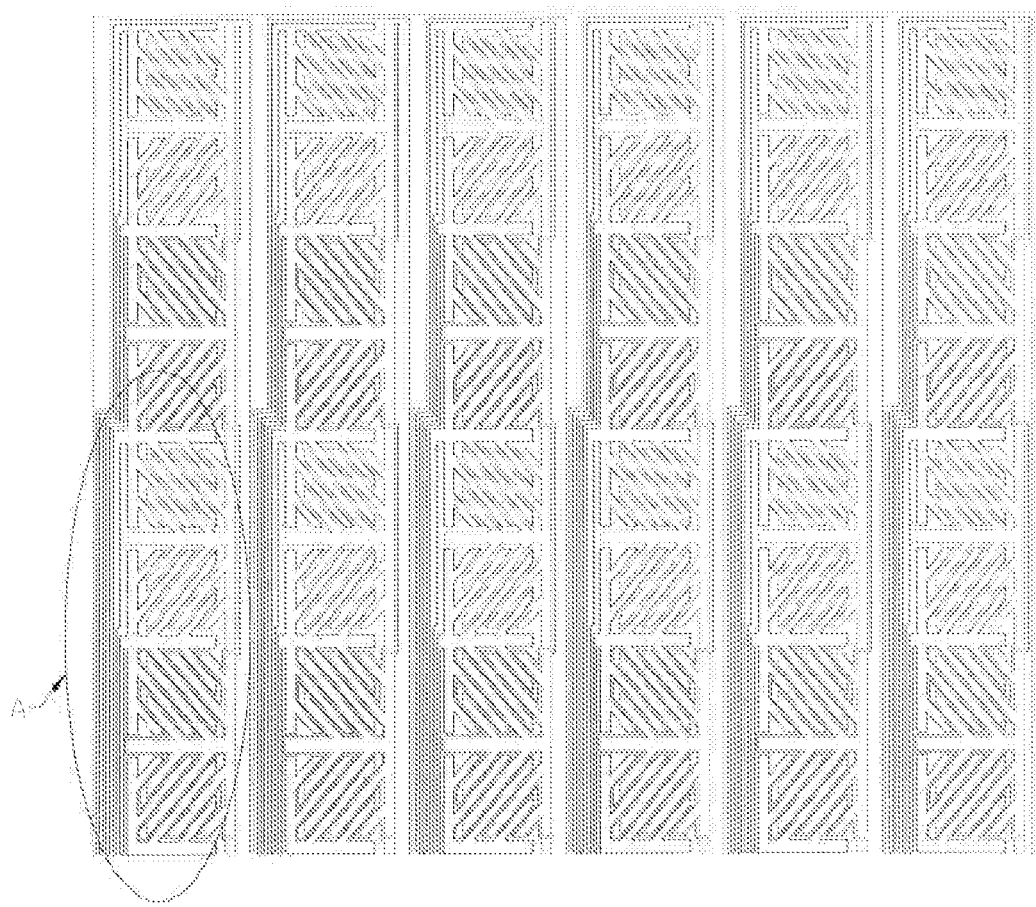
FIG. 1 is a global view of the structure with double sensing electrodes according to one embodiment of the present invention.

In order to make objects, technical details and advantages of the embodiments of the invention apparent, the technical solutions of the embodiments will be described in a clearly and fully understandable way in connection with the drawings related to the embodiments of the invention. It is obvious that the embodiments to be described are only some, not all, of the embodiments of the present invention. Based on the described embodiments herein, those skilled in the art can obtain other embodiment(s), without any inventive work, which should be within the scope of the invention.

At least one embodiment of the present invention provides an array substrate, which includes an array formed of a plurality of driving electrodes and a plurality of sensing electrodes, and the driving electrodes and the sensing electrodes have the same electrode structure, as shown in FIGS. 1-5. The electrode structure includes a T-shaped electrode trunk (driving electrode trunk 11 or sensing electrode trunk 21) and a plurality of electrode branches (driving electrode branches 12 or sensing electrode branches 22) connected to the electrode trunk and distributed symmetrically. The electrode branches form two parts, i.e., a first sub-electrode and a second sub-electrode (shown as the parts in the solid-line box and the dashed-line box in FIG. 3). A sensing electrode includes a first sensing electrode 2 and a second sensing electrode 3. One first sensing electrode 2 and one second sensing electrode 3 are respectively disposed into two intervals of three sequentially adjacent driving electrodes. Branches of a driving electrode are disposed in the gaps between adjacent electrode branches of sensing electrodes (electrode branches of a first sensing electrode 2 or electrode branches of a second sensing electrode 3) adjacent to it. The first sensing electrode 2 and the second sensing electrode 3 are connected to different signal lines respectively.

For example, in a row or, a column, the driving electrodes 1 and the sensing electrodes are arranged in such a manner that any one driving electrode 1 has its electrode branches 11 of its first sub-electrode inserted into the gaps between the branches 22 of the second sub-electrode of the preceding adjacent first sensing electrode 2 and has its electrode branches 11 of its second sub-electrode inserted into the gaps between the branches 22 of the first sub-electrode of the succeeding adjacent second sensing electrode 3. The first sensing electrodes 2 are connected to the first sensing signal lines 2', and the second sensing electrodes 3 are connected to the second sensing signal lines 3'. The driving electrodes 1 are each connected to individual driving electrode signal lines 5. Shielding ground lines 4 are used to protect electrode signals from ambient interferences and mutual interferences between adjacent sensing units.

Figure 5:
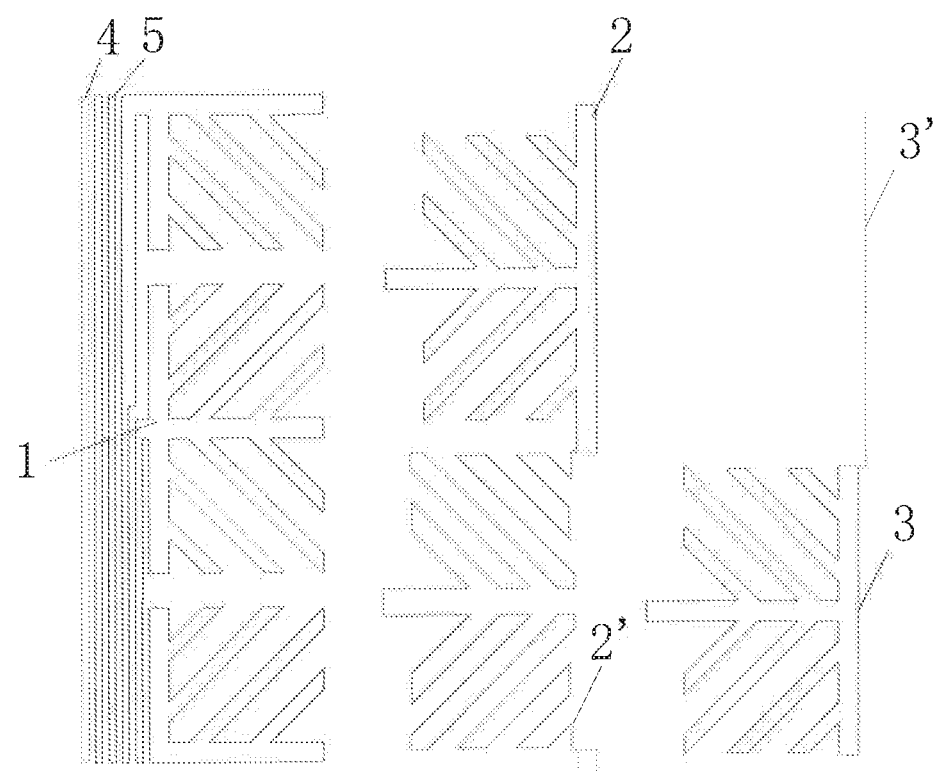
FIG. 5 is an exploded view of FIG. 2.

The electrode branches form at an angle greater than 0 degrees and smaller than 90 degrees with respect to the electrode trunk. In FIG. 5, a first sensing electrode 2 and a second sensing electrode 3 are disassembled for the purpose of better understanding. The driving electrode 1, the first sensing electrode 2, and second sensing electrode 3 are of the same shape similar to that of a snowflake and interdigitate (i.e., the protruding electrode branches of one electrode are inserted into the gaps between the electrode branches of the other electrode) to form a basic capacitive sensing unit; the whole sensing layer of the touch screen is composed a plurality of the basic units repeatedly arranged in multiple rows and columns. The first sensing signal line 2' is wired along the outline of the second sensing electrode 3, so that the wiring of the first sensing signal line 2' can be disposed in the same layer as the first sensing electrode 2, the second sensing electrode 3, and the second sensing signal line 3' without intersecting the second sensing signal line 3'.

Figure 2:
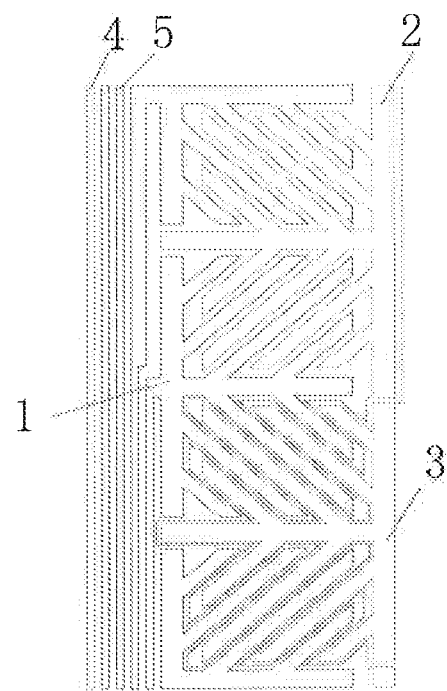
FIG. 2 is an enlarged view of area A in FIG. 1.
Figure 3:
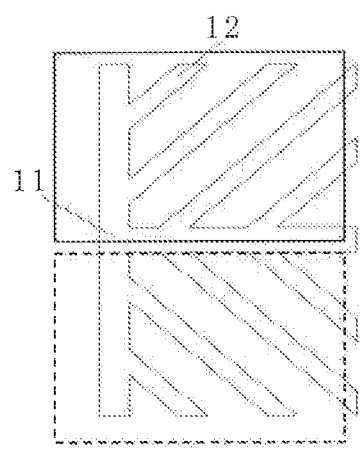
FIG. 3 shows the basic electrode unit of a driving electrode.
Figure 4:
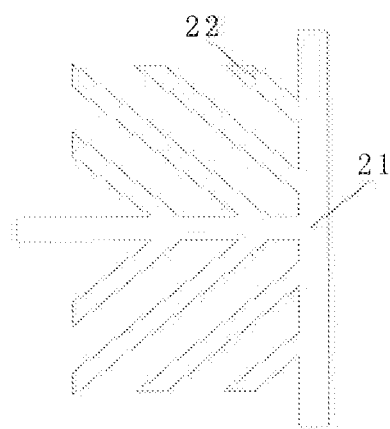
FIG. 4 shows the basic electrode unit of a sensing electrode.

Since two sensing electrodes are incorporated, this arrangement is called "double sensing" arrangement, in which same one column corresponds to two tapping points for two sensing electrodes, and one driving electrode and two half sensing electrodes constitute two basic capacitive sensing units. As shown in FIG. 2, the upper half of the driving electrode 1 (i.e., a first sub-electrode) and the lower half of the sensing electrode 2 (i.e., a second sub-electrode) form a basic capacitive sensing unit. The lower half of the driving electrode 1 (i.e., the second sub-electrode) and the upper half of the sensing electrode 3 (i.e., the first sub-electrode) form another basic capacitive sensing unit. Given the same number of sensing units to be formed, fewer driving electrodes 1 and less wiring are needed, as shown in FIG. 2. Therefore, in this way, not only a small electrode spacing (i.e. the center-to-center distance between the basic units) is guaranteed, but also the amount of wiring, i.e., the "wiring area", is reduced. Since the wiring area is one insensitive to touch and its size has a direct influence on linearity of scribing, the wiring area should be as small as possible.

Therefore, given the same layout area, the "double sensing" arrangement can provide more basic units, while given the same number of driving electrodes to be arranged, the "double sensing" arrangement can allow smaller electrode spacing (i.e., the center-to-center distance between basic units), so that a smaller discrimination spacing for two fingers is achieved to improve the touch effects. Likewise, given the same layout area, the "double sensing" arrangement can provide more basic units, while given the same electrode spacing, the "double sensing" arrangement needs a smaller number of driving electrodes, i.e., the amount of wiring for driving electrodes is reduced.

The driving electrodes and sensing electrodes are not limited to the snowflake shape in the above-mentioned embodiment. The electrode branches may form an angle of 0 or 90 degrees with the electrode trunk. That is to say, the driving electrodes and sensing electrodes may both have a comb form with their comb dents being interdigitated.

At least one embodiment of the present invention provides a pattern for the structure of an sensing layer, in which driving electrodes are arranged to interdigitate the first and second sensing electrodes, so that sensing areas between the driving electrodes and the sensing electrodes are increased and the capacitive coupling therebetween is improved; the wiring area for the driving electrodes is reduced while keeping a small electrode spacing, which allows frame adhesion and improves touch performance, i.e., the minimum discrimination spacing for two fingers is achieved and the linearity and sensitivity are significantly improved.

At least one embodiment of the present invention further provides a touch display device that includes the above-mentioned array substrate. The touch display device may be any product or component with display functionality, such as a liquid crystal panel, an electronic paper, an OLED panel, a mobile telephone, a tablet, a TV, a display, a notebook computer, a digital picture frame, a navigator a watch, etc.

What are described above is related to the illustrative embodiments of the disclosure only and not limitative to the scope of the disclosure; the scopes of the disclosure are defined by the accompanying claims.

The present application claims priority of China patent application No. 201410318179.5 filed on Jul. 4, 2014, which is incorporated herein in its entirety by reference as a part of the present application.

The invention claimed is:

1. An array substrate, comprising an array formed of a plurality of driving electrodes and a plurality of sensing electrodes, the driving electrodes and the sensing electrodes having a same electrode structure, and the electrode structure comprising:
   a T-shaped electrode trunk; and
   a plurality of electrode branches, which are symmetrically distributed and connected to the electrode trunk, forming two parts comprising a first sub-electrode and a second sub-electrode, symmetrical with respect to the electrode trunk,
   wherein the sensing electrodes comprise first sensing electrodes and second sensing electrodes, one first sensing electrode and one second sensing electrode are disposed in two intervals of three sequentially adjacent driving electrodes respectively, the driving electrodes have their electrode branches disposed in gaps between adjacent electrode branches of the sensing electrodes adjacent to the driving electrodes, and the first sensing electrodes and the second sensing electrodes are connected to different signal lines respectively; and
   wherein the driving electrode, the first sensing electrode and the second sensing electrode are disposed along a direction of the driving electrode single line and adjacent to each other, each of the driving electrodes is connected to an individual driving electrode signal line, the signal line for each of the first sensing electrode is disposed between the driving electrode and one of the second sensing electrodes which is disposed adjacent to the first sensing electrode, and is wired along the electrode branch of the second sensing electrode so as to have a shape conforming a shape of the electrode branch of the second sensing electrode.

2. The array substrate of claim 1, wherein the driving electrodes and the sensing electrodes in a column are arranged in such a manner that any one of the driving electrodes has electrode branches of its first sub-electrode inserted into gaps between electrode branches of a second sub-electrode of a preceding adjacent first sensing electrode and has electrode branches of its second sub-electrode inserted into gaps between electrode branches of a first sub-electrode of a succeeding adjacent second sensing electrode.

3. The array substrate of claim 2, wherein the signal lines for the first sensing electrodes are wired along outlines of the second sensing electrodes.

4. The array substrate of claim 2, wherein each of the driving electrodes is connected to an individual driving electrode signal line.

5. The array substrate of claim 2, further comprising a shielding ground line on the periphery of each row or column of driving electrodes and sensing electrodes.

6. The array substrate of claim 1, wherein the driving electrodes and the sensing electrodes in a row are arranged in such a manner that any one of the driving electrodes has electrode branches of its first sub-electrode inserted into gaps between electrode branches of a second sub-electrode of a preceding adjacent first sensing electrode and has electrode branches of its second sub-electrode inserted into gaps between electrode branches of a first sub-electrode of a succeeding adjacent second sensing electrode.

7. The array substrate of claim 6, wherein the signal lines for the first sensing electrodes are wired along outlines of the second sensing electrodes.

8. The array substrate of claim 6, wherein each of the driving electrodes is connected to an individual driving electrode signal line.

9. The array substrate of claim 6, further comprising a shielding ground line on the periphery of each row or column of driving electrodes and sensing electrodes.

10. The array substrate of claim 1, further comprising a shielding ground line on the periphery of each row or column of driving electrodes and sensing electrodes.

11. A touch display device, comprising the array substrate of claim 1.

12. The array substrate of claim 1, wherein the electrode branches are at an angle of 0 degrees or 90 degrees with respect to the electrode trunk.

* * * * *